United States Patent
Norberto, III et al.

(10) Patent No.: US 10,260,247 B2
(45) Date of Patent: *Apr. 16, 2019

(54) FLOATING WEIR BASKET FOR USE IN POOL SKIMMERS

(71) Applicants: Frank Norberto, III, Naples, FL (US); Frank Norberto, Jr., Naples, FL (US)

(72) Inventors: Frank Norberto, III, Naples, FL (US); Frank Norberto, Jr., Naples, FL (US)

(73) Assignee: WATERDROP ENTERPRISES, LLC, Naples, FL (US)

( * ) Notice: Subject to any disclaimer, the term of this patent is extended or adjusted under 35 U.S.C. 154(b) by 795 days.

This patent is subject to a terminal disclaimer.

(21) Appl. No.: 14/612,570

(22) Filed: Feb. 3, 2015

(65) Prior Publication Data

US 2015/0247331 A1  Sep. 3, 2015

Related U.S. Application Data

(63) Continuation-in-part of application No. 14/192,947, filed on Feb. 28, 2014.

(51) Int. Cl.
*E04H 4/12* (2006.01)
*C02F 1/76* (2006.01)

(52) U.S. Cl.
CPC ......... *E04H 4/1263* (2013.01); *E04H 4/1209* (2013.01); *E04H 4/1281* (2013.01); *C02F 1/76* (2013.01)

(58) Field of Classification Search
CPC ... E04H 4/1263; E04H 4/1272; E04H 4/1281; E04H 4/12; E04H 4/1209; B01D 35/05; B01D 2201/64; C02F 1/769; C02F 1/76; C02F 2103/42

See application file for complete search history.

(56) References Cited

U.S. PATENT DOCUMENTS

| | | | | |
|---|---|---|---|---|
| 3,616,916 A | * | 11/1971 | Greene | E04H 4/1272 210/121 |
| 4,746,424 A | * | 5/1988 | Drew | E04H 4/1263 134/167 R |
| 5,078,863 A | * | 1/1992 | Durigon | E04H 4/1263 210/123 |
| 5,133,854 A | | 7/1992 | Horvath | |
| D432,206 S | | 10/2000 | Stoltz et al. | |
| 6,187,181 B1 | | 2/2001 | Stoltz et al. | |

(Continued)

OTHER PUBLICATIONS poolskimusa.com Dec. 31, 2013.

(Continued)

*Primary Examiner* — Lucas A Stelling
*Assistant Examiner* — Angel Olivera
(74) *Attorney, Agent, or Firm* — Edward M. Livingston, Esq.; Bryan L. Loeffler, Esq.; Livingston Loeffler, P.A.

(57) ABSTRACT

A floating pool skimmer (1) that randomly travels across the surface of a pool to ensure that the entire surface of the water in the pool is cleaned. The floating pool skimmer has an elongated hose (3) that attaches to a conventional fixed pool skimmer, a vacuum inlet and/or a vacuum hose (6) connecting an automatic pool vacuum (2) to a pool pump and filter. A basket (26) held within a main housing (8) strains water and traps debris which is held in the basket by suction from the pool filter while the pool filter is operational.

2 Claims, 6 Drawing Sheets (56) References Cited

U.S. PATENT DOCUMENTS

| | | | |
|---|---|---|---|
| 6,224,753 B1 * | 5/2001 | Marbach | E04H 4/1263 |
| | | | 137/101.27 |
| 7,146,658 B2 | 12/2006 | Lyall | |
| 7,922,982 B1 * | 4/2011 | Brennan | C02F 1/688 |
| | | | 210/167.11 |
| 8,475,656 B1 | 7/2013 | Neumann | |
| 2013/0206659 A1 | 8/2013 | Hernaiz | |
| 2015/0247330 A1 * | 9/2015 | Norberto, III | E04H 4/1263 |
| | | | 210/167.11 |

OTHER PUBLICATIONS strider-ss.com Dec. 31, 2013.
subsib.allalla.com Dec. 31, 2013.
associatedindustries.com Dec. 31, 2013.
solar-breeze.com Dec. 31, 2013.

* cited by examiner

FLOATING WEIR BASKET FOR USE IN POOL SKIMMERS

CROSS-REFERENCE TO RELATED APPLICATIONS

This application is a continuation-in-part of application Ser. No. 14/192,947 filed on Feb. 28, 2014. The patent application identified above is incorporated herein by reference in its entirety to provide continuity of disclosure.

FIELD OF THE INVENTION

This invention relates to pool maintenance and more particularly, to an automatic pool skimmer that floats on the surface of a pool to ensure that the entire surface of the water in the pool is cleaned and prevents air from entering the pool pump when the level of water in the pool falls below a certain level of one or more fixed pool skimmers located in the wall of the pool.

BACKGROUND OF THE INVENTION

Conventional pool skimmers are typically fixed housings located adjacent to a pool wall in a pool deck. Pool water is drawn from the pool via a rectangular aperture located in the pool wall. The housing may be accessed from the pool deck through a circular or rectangular lid. When a pool pump is operational water is drawn from the pool through the aperture in the pool wall over a weir. Then, the water is drawn down into a removable skimmer basket (the purpose of which is to entrap leaves and other floating debris) and circulated via pipes to the pool pump through a filter and finally back into the pool through one or more outlets located in the pool wall. A problem with fixed skimmers is that they are only able to trap and remove debris from the surface of the pool water when the debris moves close to the pool skimmers to be sucked into the housing and into the skimmer basket. Therefore, a large portion the pool surface is not cleaned. An additional problem arises when a pool only has one fixed skimmer and an automatic vacuum device is connected to the skimmer. In this situation the automatic vacuum device is attached to and powered by the skimmer, thus the skimmer is not cleaning the surface of the pool water but rather supplying suction to the automatic vacuum device, which only cleans the pool floor.

There are currently mobile floating skimmers available, however these types of skimmers pose many problems. One problem experienced with existing mobile skimmers is that they are unstable and have a tendency to tip over especially when not operating as there is no suction from the pool pump pulling the skimmer downward to act as a ballast, thereby keeping the skimmer in an upright position. An additional problem also occurs when the pump is turned off and/or is not receiving suction from the pool pump. When this occurs debris caught in the skimmer can float up and out of the skimmer back into the pool, thereby defeating the purpose of the skimmer.

An additional problem occurs when the water level in the pool falls below the level of one or more fixed skimmers located in the wall of the pool. When this happens, air enters the pump system of the pool and cause the motor to burn out and fail.

A further problem exists with above ground pools wherein fixed skimmer are attached to the wall of the pool. The walls of above ground pools are subject to failing under the weight of a fixed skimmer, especially with age and under added weight of snow in the winter.

Therefore, a need exists for a multi-functional floating pool skimmer that captures and traps debris even when not operating, remains in an upright position at all times and attaches to an existing fixed skimmer, a vacuum inlet and/or an automatic vacuum line.

In addition, a need exists for a multi-functional pool skimmer that will rise and fall with the level of water in the pool, thereby preventing air from entering the pump system of the pool.

In addition, a need exists for a multi-functional pool skimmer that eliminates the need for fixed skimmers in above ground pools.

The relevant prior art includes the following references:

| Patent No. | Inventor (U.S. Patent References) | Issue/Publication Date |
|---|---|---|
| 4,746,424 | Drew | May 24, 1988 |
| 5,133,854 | Horvath | Jul. 28, 1992 |
| D432,206 | Stoltz et al. | Oct. 17, 2000 |
| 6,187,181 | Stoltz et al. | Feb. 13, 2001 |
| 6,224,753 | Marbach | May 1, 2001 |
| 7,146,658 | Lyall | Dec. 12, 2006 |
| 8,475,656 | Neumann | Jul. 2, 2013 |
| 2013/0206659 | Hernaiz | Aug. 15, 2013 |

Non-Patent Literature poolskimusa.com
strider-ss.com
subsib.allalla.com
associatedindustries.com
solar-breeze.com

SUMMARY OF THE INVENTION

The primary object of the present invention is to provide a multi-functional floating pool skimmer that captures and traps debris from the surface of a pool even when a pool pump is not operating and providing suction to the floating pool skimmer.

An additional object of the present invention is to provide a multi-functional floating pool skimmer that remains in an upright position at all times even when the pool skimmer is not operating.

An additional object of the present invention is to provide a multi-functional floating pool skimmer that will attach to an existing fixed skimmer, a vacuum inlet and/or an automatic vacuum line so the automatic pool skimmer can be powered by the pool pump.

An additional object of the present invention is to provide a multi-functional floating pool skimmer that will rise and fall with the level of water in the pool, thereby preventing air from entering the pump system of the pool.

An additional object of the present invention is to provide a multi-functional floating pool skimmer that eliminates the need for fixed skimmers in above ground pools.

The present invention fulfills the above and other objects by providing a multi-functional floating pool skimmer that floats on the surface of the water in a pool and randomly travels across the surface of the pool to ensure that the entire surface of the water is cleaned. The floating pool skimmer has an elongated hose that attaches to a conventional fixed pool skimmer, a vacuum inlet and/or a vacuum hose connecting an automatic pool vacuum to the pool pump and filter. The elongated hose of the floating pool skimmer may be attached to a vacuum hose using a T-fitting so that suction from the pool filter is supplied to the vacuum and to the floating skimmer simultaneously. The T-fitting preferably has a swiveling connection so that the floating pool skimmer will rotate and not twist the hose to which it is attached. A basket held within a main housing catches debris which is held in the basket by suction from the pool filter while the pool filter is operational. When the pool filter is not running a floating weir and/or one or more weir doors prevent debris from floating back out of the basket. Apertures located on the main housing allow water into the main housing that then acts as a ballast to ensure the floating pool skimmer remains upright at all times. Alternatively, a weight may be located in the main housing to act as a ballast. In addition one or more weights may be located within the floats to add stability to the multifunctional floating pool skimmer of the present invention.

Additional features of the multifunctional floating pool skimmer of the present invention may include a shutoff valve to control the amount of suction being delivered to the floating pool skimmer in relation to the amount of suction being delivered to a vacuum. A tether may also be attached to the floating pool skimmer and the vacuum so that the floating pool skimmer is pulled around the pool by the vacuum.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1A:
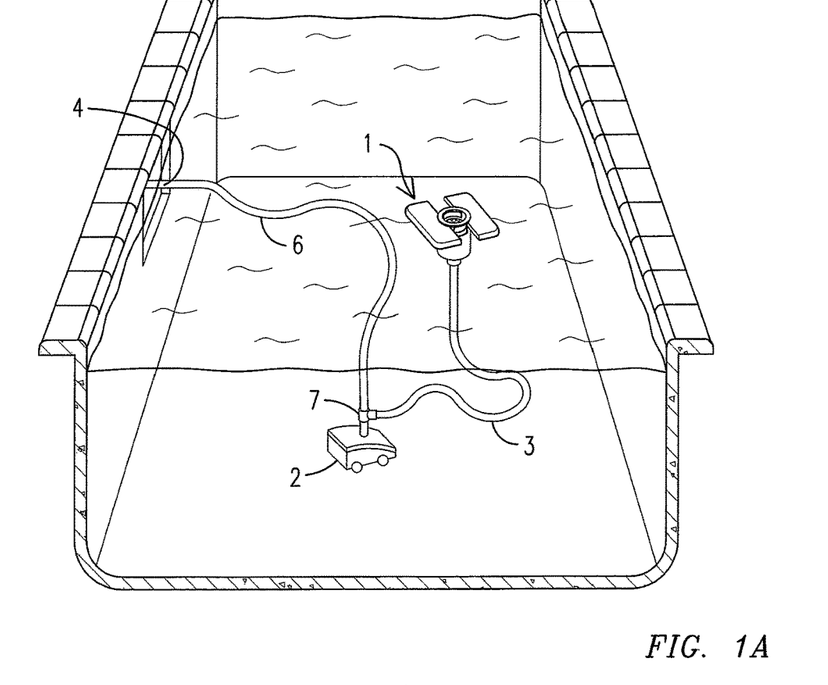
FIG. 1A is cutaway view of a pool in which a floating pool skimmer of the present invention is connected to an automatic pool vacuum with an elongated hose.
Figure 1B:
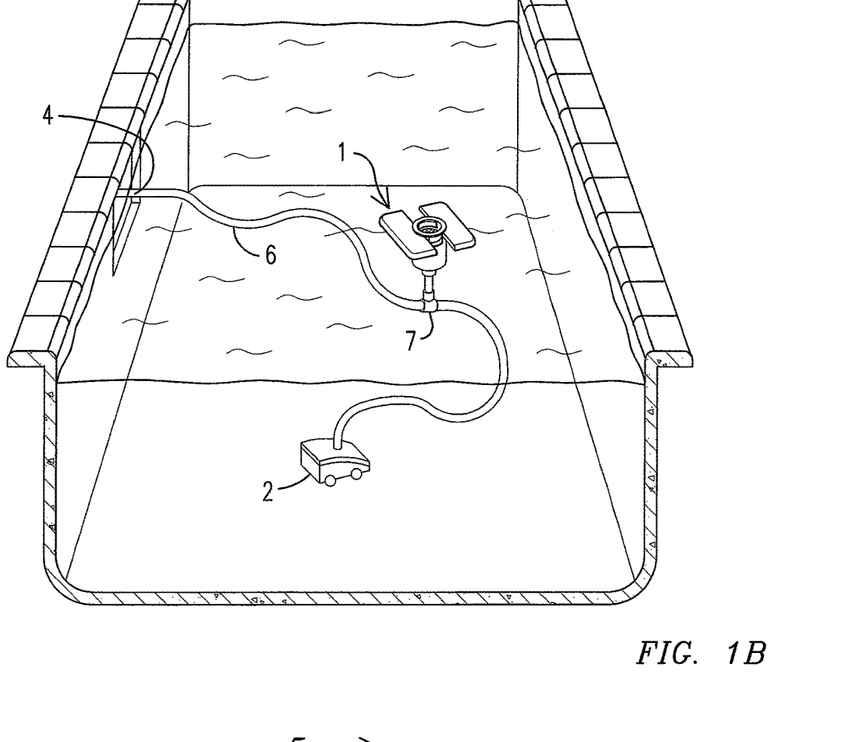
FIG. 1B is cutaway view of a pool in which a floating pool skimmer of the present invention is connected to an automatic pool vacuum without an elongated hose.
Figure 2:
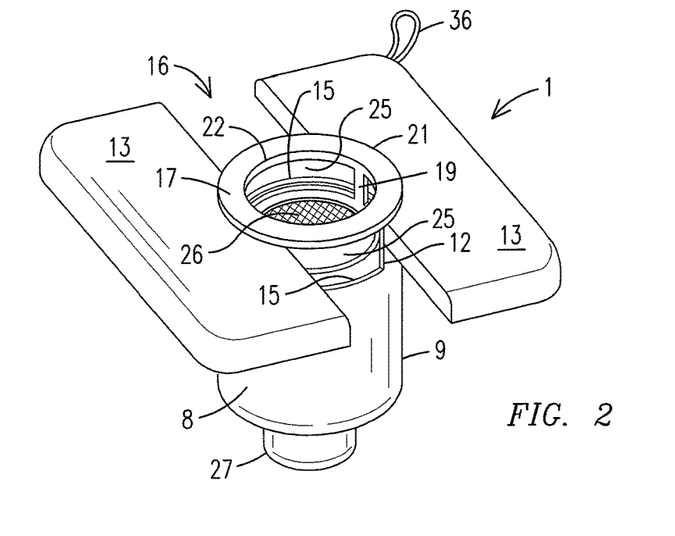
FIG. 2 is a perspective side view of the floating pool skimmer of the present invention.
Figure 10:
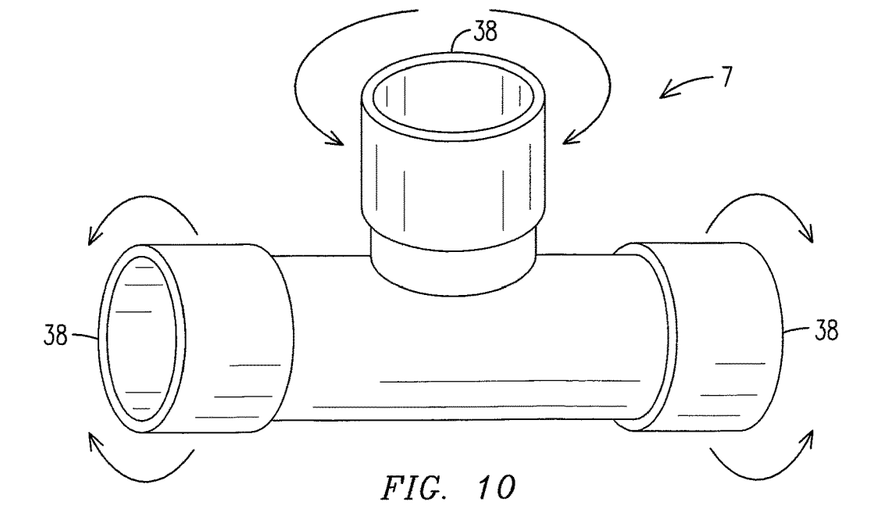
FIG. 10 is a front perspective view of a T-fitting of the present invention.

For purposes of describing the preferred embodiment, the terminology used in reference to the numbered components in the drawings is as follows:
1. floating pool skimmer, generally
2. automatic pool vacuum
3. elongated hose
4. fixed pool skimmer
5. floating means
6. vacuum hose
7. T-fitting
8. main housing
9. perimeter wall of main housing
10. bottom surface of main housing
11. upper edge of main housing
12. opening of main housing
13. float
14. aperture
15. main housing inlet
16. channel
17. floating weir
18. perimeter wall of floating weir
19. inner surface of floating weir
20. outer surface of floating weir
21. upper edge of floating weir
22. upper opening of floating weir
23. lower edge of floating weir
24. lower opening of floating weir
25. floating weir inlet
26. basket
27. coupling
28. spacer
29. guide
30. weir door
31. hinge
32. inner housing
33. chlorine tab
34. ballast weight
35. float weight
36. tether attachment
37. shutoff valve
38. swiveling connection
39. chlorine dispenser
40. combined floating weir basket With reference to FIGS. 1A and 1B, a cutaway view of a pool in which a floating pool skimmer 1 of the present invention connected to an automatic pool vacuum 2 with an elongated hose 3 and without an elongated hose 3, respectively, is illustrated. The automatic pool skimmer 1 floats on the surface of the water in the pool and randomly travels across the surface of the pool to ensure that the entire surface of the water is cleaned. The floating pool skimmer 1 may have an elongated hose 3 that attaches to a conventional fixed pool skimmer 4, a vacuum inlet and/or a vacuum hose 6 connecting an automatic pool vacuum to the pool pump and filter. The elongated hose 3 of the floating pool skimmer may be attached to a vacuum hose using a T-fitting 7 so that suction from the pool filter is supplied to the vacuum and to the floating skimmer simultaneously. Alternatively, the floating pool skimmer 1 may also be attached directly to the vacuum hose 6 without the use of the elongated hose 3, by using only the T-fitting 7. The T-fitting 7 preferably has one or more swiveling connections, as illustrated in FIG. 10, so that the floating pool skimmer 1 will rotate and not twist the vacuum hose 6 to which it is attached.

Figure 3:
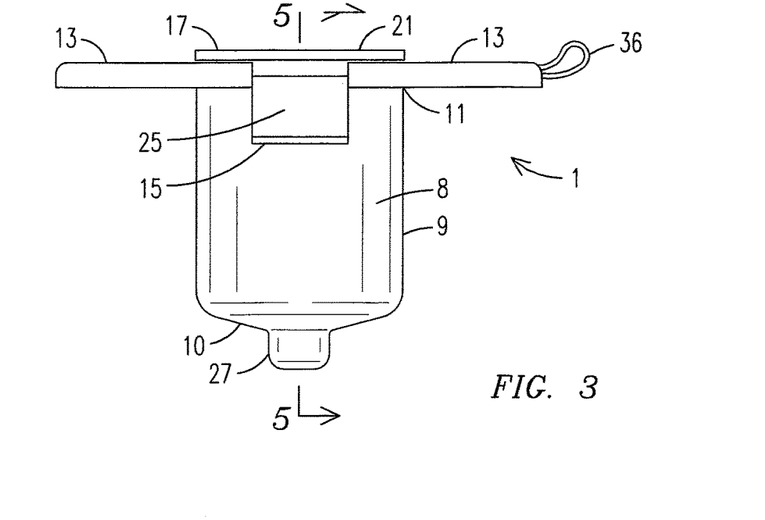
FIG. 3 is a side view of the floating pool skimmer of the present invention having a floating weir in a downward position.

With reference to FIGS. 2-5, a perspective side view of the floating pool skimmer 1 of the present invention, a side view of the floating pool skimmer 1 having a floating weir 17 in a downward position, a side view of the floating pool skimmer 1 having a floating weir 17 in an upward position, and a cross-sectional view along line 5-5 of FIG. 3, respectively, are illustrated. The floating pool skimmer 1 comprises a main housing 8 having a cup-like structure with a perimeter wall 9, a bottom surface 10 and an upper edge 11 of the perimeter wall 9. Said upper edge 11 of the perimeter wall 9 surrounds an opening 12 into the interior of the main housing 8. One or more floats 13 extend outward from the main housing 8 proximate to the upper edge 11 of the perimeter wall 9 to support the floating pool skimmer 1 in water and to keep the upper edge 11 of the perimeter wall 9 substantially parallel to the surface of the water. One or more ballast weights 34 may be located in the main housing 8 to act as a ballast to ensure the main housing 8 remains submerged just below the surface of the water. In addition one or more float weights 35 may be located within the floats 13 to add stability to the multifunctional floating pool skimmer 1 of the present invention. The main housing 8 further comprises one or more main housing inlets 15 located proximate to the upper edge 11 of the perimeter wall 9 to allow pool water and any debris floating on the surface of the pool water to flow into the main housing 8. The one or more floats 13 have channels 16 that allow water to reach the main housing inlets 15 of the main housing 8.

Figure 4:
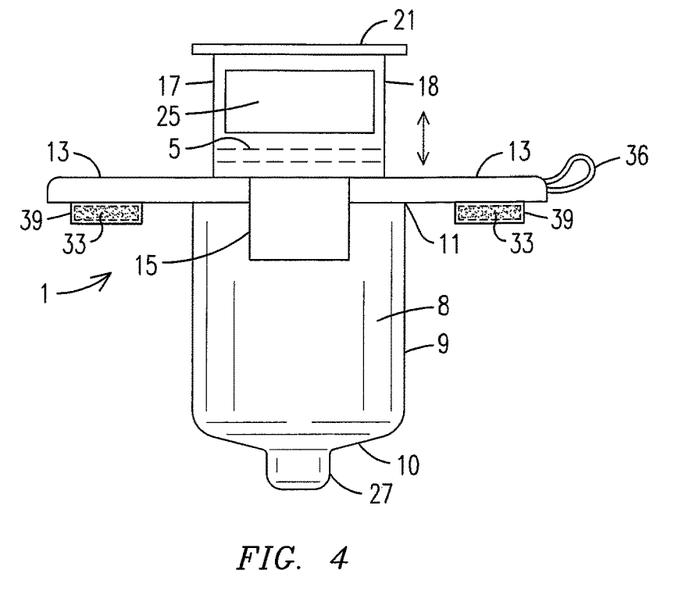
FIG. 4 is a side view of the floating pool skimmer having a floating weir in an upward position.
Figure 5:
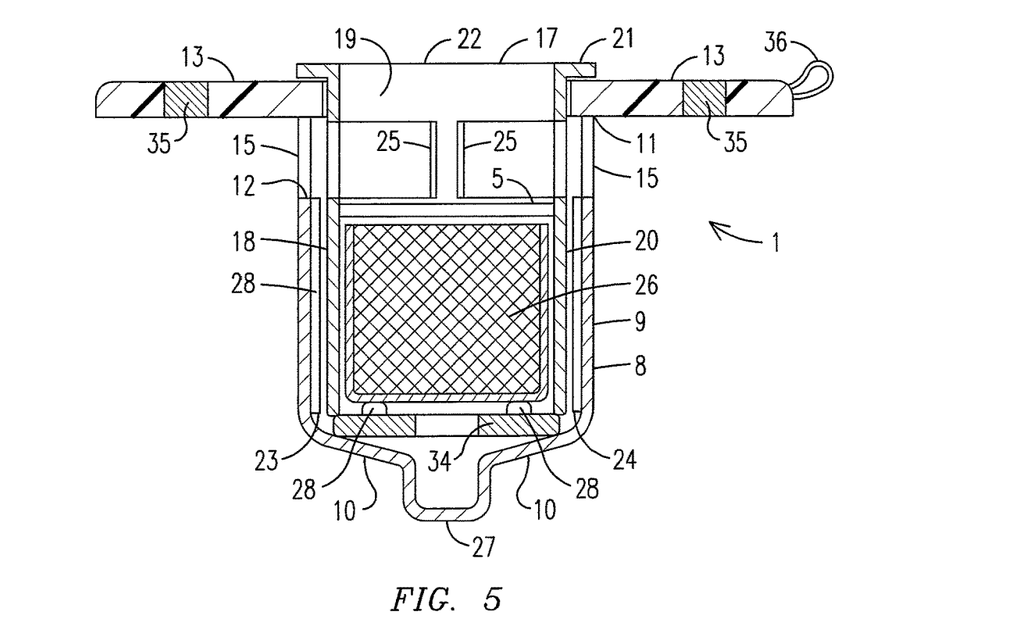
FIG. 5 is a cross-sectional view along line 5-5 of FIG. 3 of the floating pool skimmer of the present invention having a floating weir in a downward position.

A floating weir 17 is located within the main housing 8. The floating weir 17 comprises a perimeter wall 18 preferably having substantially the same shape as the perimeter wall 9 of the main housing 8. The perimeter wall 18 of the floating weir 17 further comprises an inner surface 19, an outer surface 20, an upper edge 21 surrounding an upper opening 22 and a lower edge 23 surrounding a lower opening 24. One or more floating weir inlets 25 are located on the perimeter wall 18 of the floating weir 17 proximate to the upper edge 21. When the floating pool skimmer 1 is operational and suction is supplied to the main housing 8, the floating weir 17 is sucked into the main housing 8 into a downward position, as illustrated in FIG. 3, to allow water to pass through the one or more floating weir inlets 25. A floating means 5 such as a ring of foam, or other floating material is preferably located below the floating weir inlets 25. When the floating pool skimmer 1 is not operational and suction is not being supplied to the main housing 8, the floating weir 17 floats upward partially projecting out of the main housing 8 into an upward position, as illustrated in FIG. 4, so the floating weir inlets 25 are located above the surface of the water to prevent any debris caught within the floating pool skimmer 1 from escaping out of the floating weir inlets 25. As an alternative to weir inlets 25, the height of the perimeter wall 18 of the floating weir 17 may be less than the height of the perimeter wall 9 of the main housing 8 so that when the floating weir 17 is in a downward position, the upper edge 21 of the perimeter wall 18 of the floating weir 17 is located below the main housing inlets 15. As illustrated in FIG. 5, spacers 28 and/or guides 29 may be located between the main housing 8 and the floating weir 17. As illustrated here, the spacers 28 are located on top of the ballast weight 34. The spacers 28 and guides 29 center the floating weir 17 within the main housing 8 and also keep the floating weir inlet 25 lined up with the main housing inlet 15 when the floating weir 17 is in a downward position.

A basket 26 is located within the main housing 8 that strains water passing through the floating pool skimmer 1 to capture debris and prevent debris from passing through a coupling 27 located on the bottom surface 10 of the main housing 8 that is attached to the elongated hose 3. A tether may also be attached to the floating pool skimmer 1 via a tether attachment 36, such as a loop, and the vacuum 2 so that the floating pool skimmer 1 is pulled around the pool by the vacuum 2. An additional feature of the present invention may be one or more chlorine dispenser 32 may be located on the floats 13 for the placement and disbursement of chlorine tabs 33 into the pool water.

Figure 6:
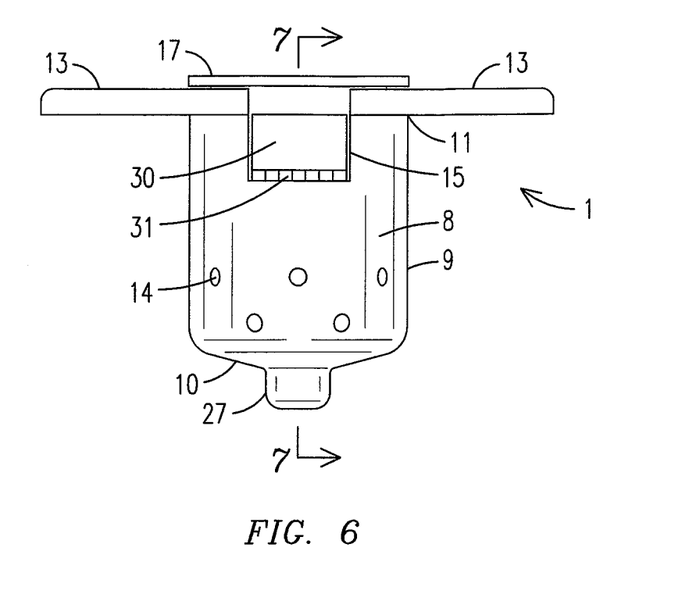
FIG. 6 is a side view of the floating pool skimmer having a weir door.
Figure 7:
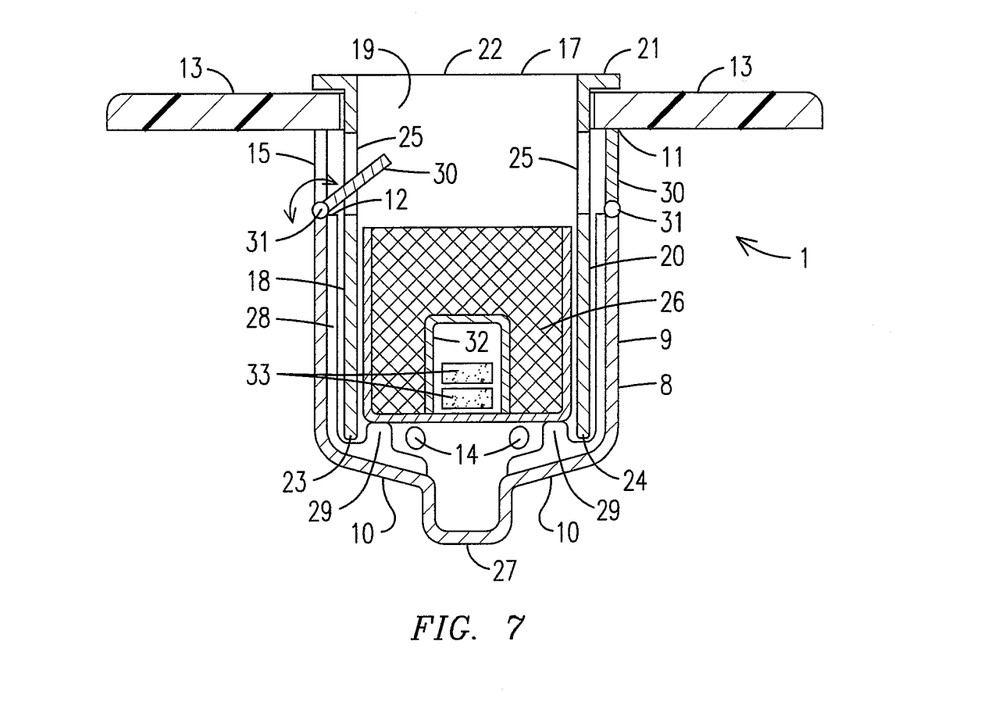
FIG. 7 is a cross-sectional view along line 7-7 of FIG. 6 of the floating pool skimmer having a weir door.

With reference to FIGS. 6-7, a side view of the floating pool skimmer 1 having a weir door 30, and a cross-sectional view along line 7-7 of FIG. 6, respectively, are illustrated. The floating pool skimmer 1 comprises a main housing 8 having a cup-like structure with a perimeter wall 9, a bottom surface 10 and an upper edge 11 of the perimeter wall 9. Said upper edge 11 of the perimeter wall 9 surrounds an opening 12 into the interior of the main housing 8. One or more floats 13 extend outward from the main housing 8 proximate to the upper edge 11 of the perimeter wall 9 to support the floating pool skimmer 1 in water and to keep the upper edge 11 of the perimeter wall 9 substantially parallel to the surface of the water. One or more apertures 14 are located on the main housing 8 on the perimeter wall 9 and/or the bottom surface 10, to allow water to flow into the main housing 8 to ensure the main housing 8 remains submerged just below the surface of the water. The main housing 8 further comprises one or more main housing inlets 15 located proximate to the upper edge 11 of the perimeter wall 9 to allow pool water and any debris floating on the surface of the pool water to flow into the main housing 8. The one or more floats 13 have channels 16 that allow water to reach the main housing inlets 15 of the main housing 8.

A weir door 30 is located on the main housing inlet 15 of the main housing 8. The weir door 30 is attached to the main housing 8 by a hinge 31 or other rotating means that allows the weir door 30 to open inward into the main housing 8 to allow water to pass through the main housing inlet 15 into the main housing 8 when the floating pool skimmer 1 is operational and suction is supplied to the main housing 8. When the floating pool skimmer 1 is not operational and suction is not being supplied to the main housing 8, the weir door 30 returns to an upward position in line with the perimeter wall 9 of the main housing 8 to prevent any debris caught within the floating pool skimmer 1 from escaping out of the main housing inlet 15.

A basket 26 is located within the main housing 8 that strains water passing through the floating pool skimmer 1 to capture debris and prevent debris from passing through a coupling 27 located on the bottom surface 10 of the main housing 8 that is attached to the elongated hose 3. In addition, an inner housing 32 may be located within the basket 26 for the placement and disbursement of chlorine tabs 33 into the pool water.

Figure 8:
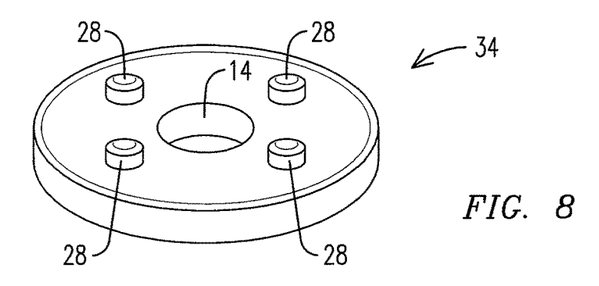
FIG. 8 is a front perspective view of a ballast weight of the present invention.

With reference to FIG. 8, a front perspective view of a ballast weight 34 of the present invention is illustrated. The ballast weight 34 may be located in the main housing 8 to act as a ballast to ensure the main housing 8 remains submerged just below the surface of the water. The ballast weight 34 preferably has the same shape as the main housing 8 and comprises a central aperture 14 and one or more spacers located on top of the ballast weight 34, to prevent the ballast weight from blocking the basket 26, thereby ensuring the maximum amount of suction is being provided.

Figure 9:
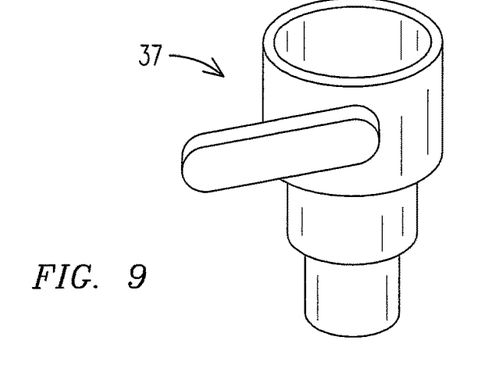
FIG. 9 is a front perspective view of a shutoff valve of the present invention.

With reference to FIG. 9, a front perspective view of a shutoff valve 37 of the present invention is illustrated. The shutoff valve 37 allows a user to control the amount of suction being delivered to the floating pool skimmer 1 in relation to the amount of suction being delivered to the vacuum 2.

With reference to FIG. 10, a front perspective view of a T-fitting 7 of the present invention is illustrated. The T-fitting 7 ensures suction from the fixed pool skimmer 4 is supplied to the automatic pool vacuum 2 and to the floating pool skimmer 1 simultaneously, thereby allowing the floating pool skimmer 1 and automatic pool vacuum 2 to operate at the same time from a single source of suction provided by a pool pump. The T-fitting 7 preferably has one or more swiveling connections 38 so that the floating pool skimmer 1 will rotate and not twist the hose to which it is attached.

Figure 11:
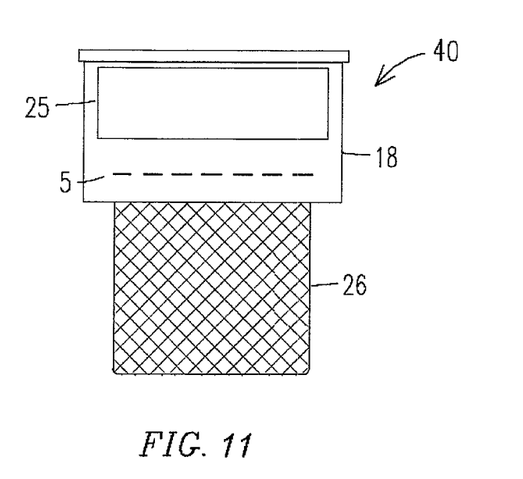
FIG. 11 is a side view of a combined floating weir basket of the present invention.

Finally with reference to FIG. 11, a side view of a combined floating weir basket 40 of the present invention is illustrated. The floating weir basket 40 comprises one or more weir inlets 25 located on the perimeter wall 18 and a basket 26 located below the perimeter wall 18. A floating means 5 such as a ring of foam, or other floating material is preferably located below the one or more weir inlets 25.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

We claim:

1. A floating weir basket comprising:
   a perimeter wall having an inner surface, an outer surface, an upper edge surrounding an upper opening and a lower edge;
   the perimeter wall of the floating weir basket defining at least one floating weir inlet below the upper edge of the perimeter wall;
   a basket extending downward from the perimeter wall that strains the water passing through the at least one floating weir inlet to capture debris and prevent debris from passing through the basket; and
   a floating means attached to the inner surface of the perimeter wall of the floating weir basket below the at least one weir inlet that forces the portion of the perimeter wall where the at least one floating weir inlet is located into an upward position wherein the at least one weir inlet is positioned above a surface of water when the floating weir basket is placed in water.

2. A floating weir basket comprising:
   a perimeter wall having an inner surface, an outer surface, an upper edge surrounding an upper opening;
   the perimeter wall of the floating weir basket defining at least one floating weir inlet below the upper edge of the perimeter wall;
   a basket extending downward from the perimeter wall that strains the water passing through the at least one floating weir inlet to capture debris and prevent debris from passing through the basket; and
   a floating means attached to the inner surface of the perimeter wall of the floating weir basket below the at least one weir inlet and above the basket that forces the portion of the perimeter wall where the at least one floating weir inlet is located into an upward position wherein the at least one weir inlet is positioned above a surface of water when the floating weir basket is placed in water.

* * * * *